United States Patent [19]

Endoh

[11] Patent Number: 5,231,615
[45] Date of Patent: Jul. 27, 1993

[54] CARRIAGE FIXING APPARATUS AND DISK DRIVER HAVING SUCH CARRIAGE FIXING APPARATUS

[75] Inventor: Atsushi Endoh, Tachikawa, Japan
[73] Assignee: TEAC Corporation, Japan
[21] Appl. No.: 686,688
[22] Filed: Apr. 17, 1991
[30] Foreign Application Priority Data
Apr. 23, 1990 [JP] Japan .................. 2-43253[U]
[51] Int. Cl.[5] ............... G11B 17/22; G11B 5/596
[52] U.S. Cl. ............................... 369/32; 360/78.13; 360/69
[58] Field of Search .......... 369/32, 44.29, 44.27, 369/56, 79, 30, 121, 39, 180; 360/78.04, 78.13, 13, 69, 71, 75

[56] References Cited
U.S. PATENT DOCUMENTS
4,273,342 6/1981 Gilson et al. ............... 369/32
5,083,230 1/1992 Nishioka ..................... 369/32

Primary Examiner—Robert J. Pascal
Assistant Examiner—Ali Neyzari
Attorney, Agent, or Firm—Andrus, Sceales, Starke & Sawall

[57] ABSTRACT

A carriage fixing apparatus in a disk driver detects that the head carriage which moves a head is located at a predetermined position, and then automatically fixes the head carriage by means of mechanically engaging with the head carriage.

17 Claims, 10 Drawing Sheets

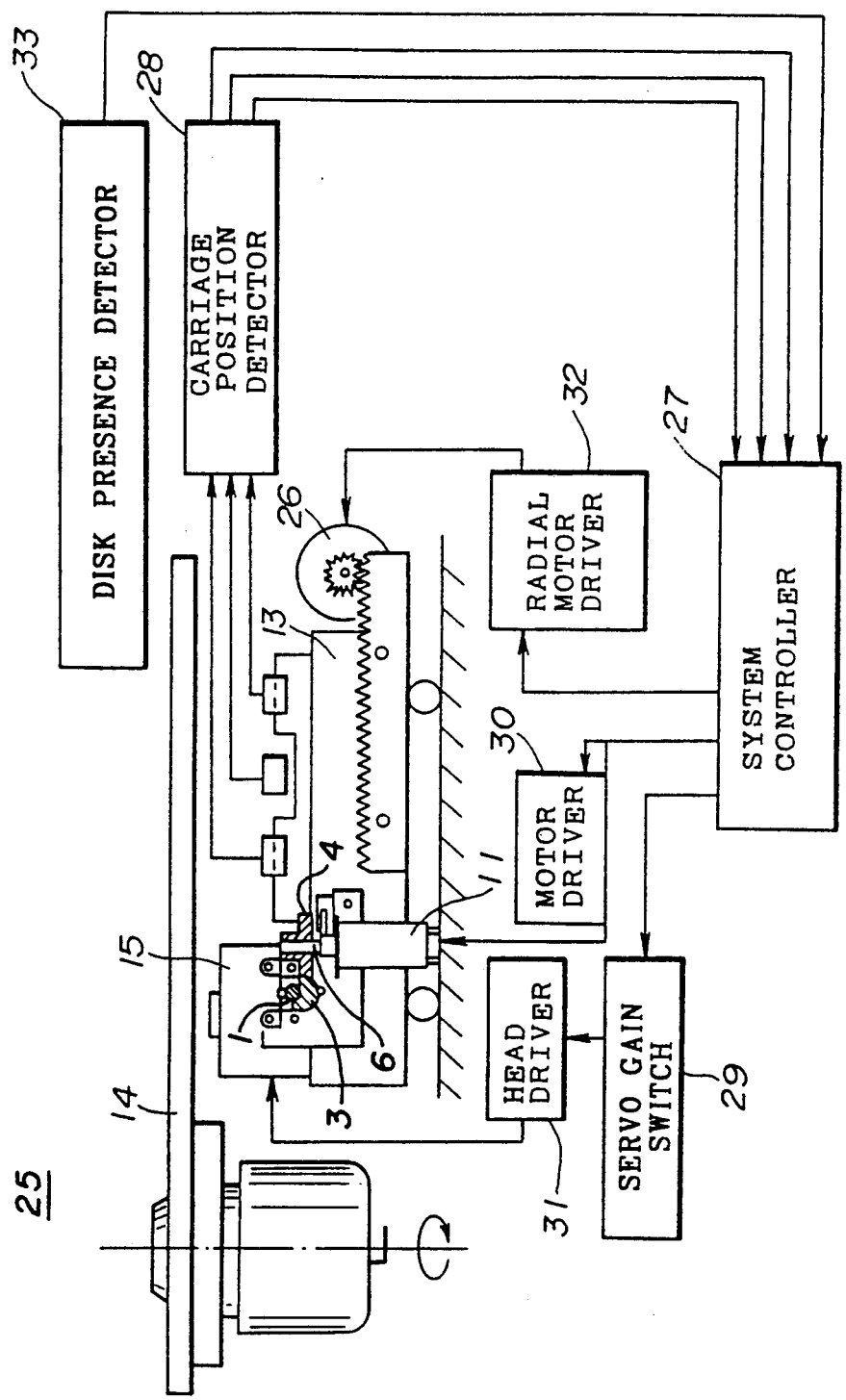

5,231,615

CARRIAGE FIXING APPARATUS AND DISK DRIVER HAVING SUCH CARRIAGE FIXING APPARATUS

BACKGROUND OF THE INVENTION

The present invention relates generally to a carriage fixing apparatus which fixes a head carriage for moving a head in a disk driver during transporting and/or shipping thereof, and a disk driver having such a carriage fixing apparatus.

In the well-known disk driver, a head is attached to a head carriage to be moved in a radial direction of a disk. Since the head carriage can be moved in a radial direction of the disk by a small load, it gets damaged when the disk driver is dropped or vibrated. Accordingly, in the conventional disk driver, the head carriage is fixed by the carriage fixing apparatus during transporting and/or shipping.

Among the conventional carriage fixing apparatus; there are a first head carriage screwed on a chassis by hand, a second head carriage fixed by engaging a groove 36a in a head carriage 36 with a carriage fixing lever 34 located at a broken line by hand, which carriage fixing lever 34, is pivotably supported around a fixing pin 35 mounted on a chassis (not shown), as shown in FIG. 1, and a third head carriage fixed by a solenoid and released from being fixed by supplying power of the disk driver to the solenoid.

However, the above conventional carriage fixing apparatus has the following disadvantages:

The head carriage has to be fixed by hand every time the disk driver is moved in the first and second carriage fixing apparatus. Besides, the head carriage will be damaged if a user drives the head carriage without releasing the head carriage from being fixed. Moreover, it is difficult to fix the head carriage since the head carriage must be screwed from a back surface of the disk driver in the first carriage fixing apparatus. Furthermore, in the third carriage fixing apparatus, the disk driver becomes expensive because of the expensive solenoid. In addition, since a large amount of power is necessary to turn on the solenoid, the amount of power consumed by the disk driver increases in a solenoid continuous turning-on method, and the noise generated from the solenoid turned-on negatively affects each element of the disk driver. In addition, it is necessary to use a shield backed-up voltage supply in an intermittent driving method which drives the solenoid during the shielding period even if power is applied to the disk driver.

SUMMARY OF THE INVENTION

Accordingly, it is a general object of the present invention to provide a novel and useful carriage fixing apparatus and a disk driver having such a carriage fixing apparatus in which the above disadvantages are eliminated.

Another object of the present invention is to provide a relatively inexpensive carriage fixing apparatus and a disk driver having such a carriage fixing apparatus in which a head carriage is automatically fixed and released from being fixed.

The more specific object of the present invention is to provide a carriage fixing apparatus in a disk driver comprising a head by which information is recorded on and/or reproduced from a disk, which carriage fixing apparatus comprises first detecting means for detecting a position of a head carriage which moves the head, and fixing means, responsive to the first detecting means, for automatically fixing the head carriage by means of mechanically engaging with the head carriage only when the first detecting means detects that the head carriage is located at a predetermined position.

Another more specific object of the present invention is to provide a disk driver which comprises a head by which information is recorded on and/or reproduced from a disk, a head carriage which moves the head, and a carriage fixing apparatus comprising first detecting means for detecting a position of a head carriage and fixing means, responsive to the first detecting means, for automatically fixing the head carriage by means of mechanically engaging with the head carriage when the first detecting means detects that the head carriage is located at a predetermined position.

According to the present invention, the fixing means automatically focus the head carriage under the predetermined condition. In addition, the carriage fixing apparatus and a disk driver having such a carriage fixing apparatus become relatively inexpensive since the fixing means mechanically engages with the head carriage.

Other objects and further features of the present invention will be apparent from the following description when read in conjunction with the accompanying drawings.

BRIEF DESCRIPTION OF THE DRAWINGS

FIG. 9 shows a block diagram of a disk driver according to the present invention.

DESCRIPTION OF THE PREFERRED EMBODIMENTS

In the carriage fixing apparatus according to the present invention, a lock pin is projected under the predetermined condition so as to be engaged with a fixing portion of a head carriage and fix the head carriage.

Figure 1:
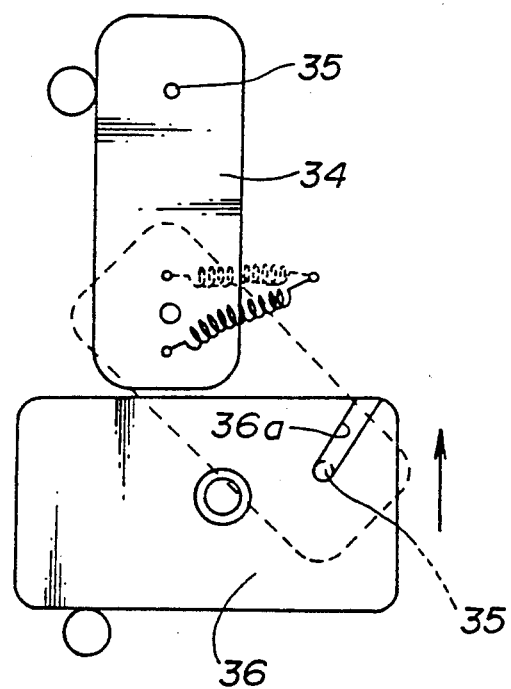
FIG. 1 shows a view for explaining a conventional carriage fixing apparatus.
Figure 2A:
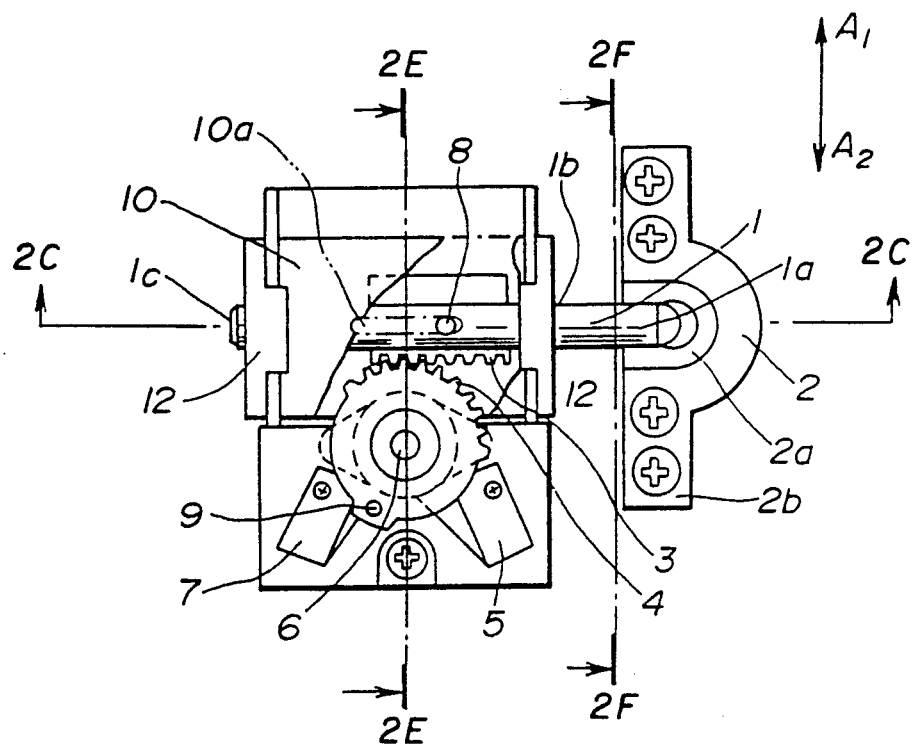
FIGS. 2A through 2H show an essential construction of a carriage fixing apparatus according to the present invention.
Figure 2B:
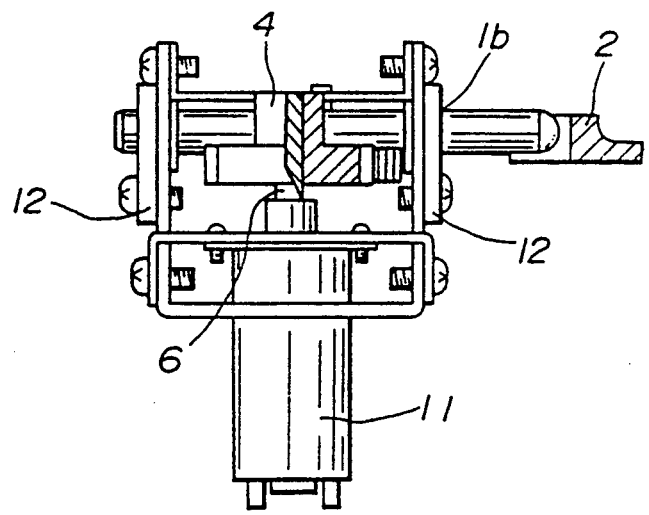
Figure 2C:
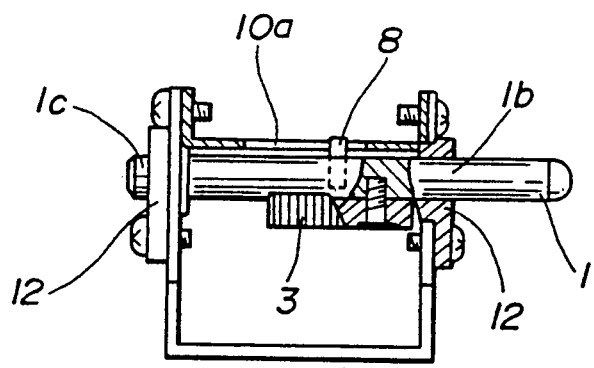

A description will now be given of a projection mechanism of the lock pin 1 with reference to FIGS. 2A to 2H. The projection mechanism of the lock pin 1 comprises a lock pin 1, a rack 3, a gear 4 and a motor 11. FIG. 2A is a plane view of the carriage fixing apparatus in which a lock pin 1 is engaged with the fixing part 2. A crown plate 10 is partially sectioned so that the projection mechanism of the lock pin 1 can be easily understood. The rack 3 is fixed around the lock pin, as shown in FIGS. 2A and Hereupon, FIG. 2C is an AA sectional view along the line 2E-2E of the FIG. 2A. The rack 3 is engaged with the gear 4, as shown in FIG. 2A, and the gear 4 is fixed around a motor shaft 6 of the motor 1 shown in FIG. 2B. Hereupon, FIG. 2B shows a bottom view of the FIG. 2A.

Switches 5 and 7 respectively limit the amount of movement of the lock pin 1. The gear 4 rotates with the motor 11, and the pin 9 mounted on the gear 4 operates one of the switches 5 and 7 as the motor rotates clockwise or counterclockwise. Therefore, under one predetermined condition, the motor 11 rotates clockwise, as shown in FIG. 2A, so that the pin 9 operates the switch 7 to stop the rotating of the motor 11. Then, the lock pin 1 is projected and inserted into the fixing part 2. On the other hand, under another predetermined condition, the motor 11 rotates counterclockwise, so that the pin 9 operates the switch 5 to stop the rotating of the motor 11. Then, the lock pin 1 is withdrawn from the fixing part 2. A pin 8 mounted on the lock pin 1, as shown in FIGS. 2A and 2C, is so engaged with a groove 10a in the crown plate 10 that the lock pin 1 will not be rotated. Thus, the gear 4 will not be separated from the rack 3. Moreover, for smooth action of the lock pin 1, a resin bearing metal 12 is provided at a front part 1b and an end part 1c of the lock pin 1, as shown in FIG. 2D. FIG. 2D is a left side view of FIG. 2A.

Figure 2E:
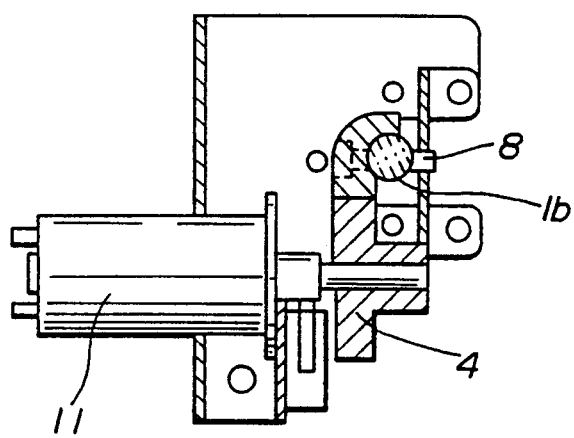
Figure 2D:
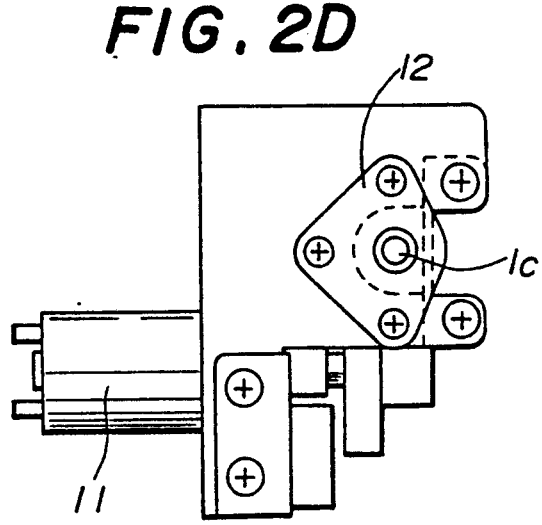
Figure 2F:
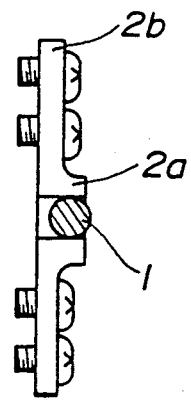
Figure 2G:
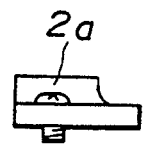

FIG. 2E is a sectional view along the line 2E-2E of the FIG. 2A. As shown in FIGS. 2A, 2B, 2C, and 2E, the rack 3 is engaged with the center of the lock pin 1 which corresponds to the opposite position at which the pin 8 is mounted. FIG. 2G is a front view of the FIG. 2A in which the lock pin 1 is removed. FIGS. 2A, 2B, 2F, and 2G show the shape of the fixing part 2. FIG. 2F is a sectional view along the line 2F-2F of FIG. 2A, The carriage fixing apparatus without the fixing part 2 is fixed in the disk driver (not shown).

Figure 2H:
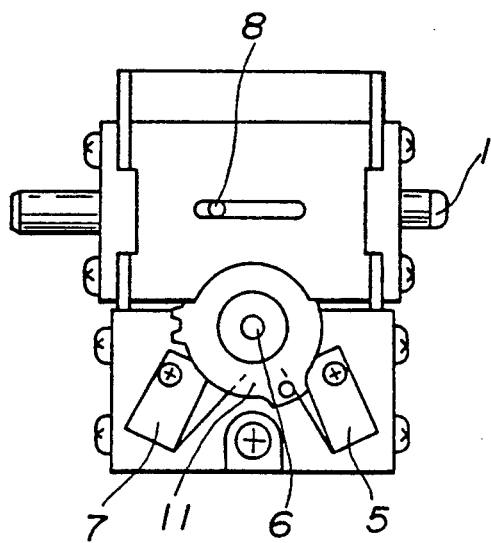

As mentioned above, the lock pin 1 is projected under the predetermined condition. And the lock pin 1 is withdrawn when the predetermined condition cannot be established, as shown in FIG.2H. The predetermined condition is determined by the lock pin controlling described below. However, before describing the lock pin controlling, a description will now be given of the relationships between the lock pin 1 and the fixing part 2 and between the fixing part 2 and the head carriage 13.

As shown in FIGS. 2A, 2B, and 2F, a head part 1a of the lock pin 1 is to be inserted into the fixing part 2. The fixing part 2 moves, as shown in FIG. 2A, in a $A_1A_2$ direction with the head carriage 13. The fixing part 2 has a concave portion at an insertion vicinity 2a in which the lock pin 1 is inserted, as shown in FIG. 2F, and thus the lock pin 1 does not move in the $A_1A_2$ direction. The insertion vicinity 2a is higher than another part 2b.

Since the head 1a of the lock pin 1 is formed in an approximately domed shape, as shown in FIG. 2A, it is smoothly inserted into the fixing part 2. The fixing part 2 is gouged out so as to correspond to the insertion part 2a having a domed shape. Thus, when the lock pin 1 is projected, it is completely fixed in the fixing part 2. The fixing part 2 is screwed on the head carriage 13, as shown in FIG. 3. Therefore, when the fixing part 2 is fixed by the lock pin 1, the head carriage 13 is accordingly fixed.

Figure 3A:
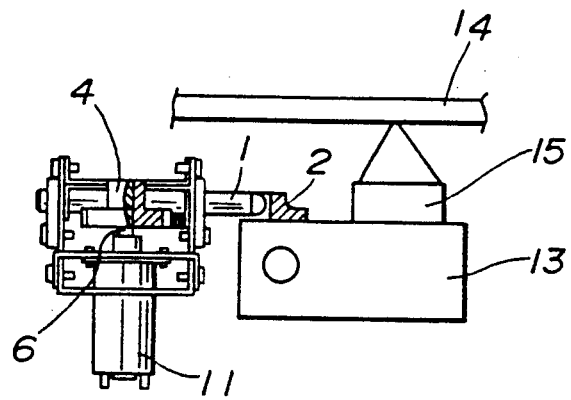
FIGS. 3A and 3B show a relationship between the carriage fixing apparatus shown in FIG. 1, a head carriage, and a disk.
Figure 3B:
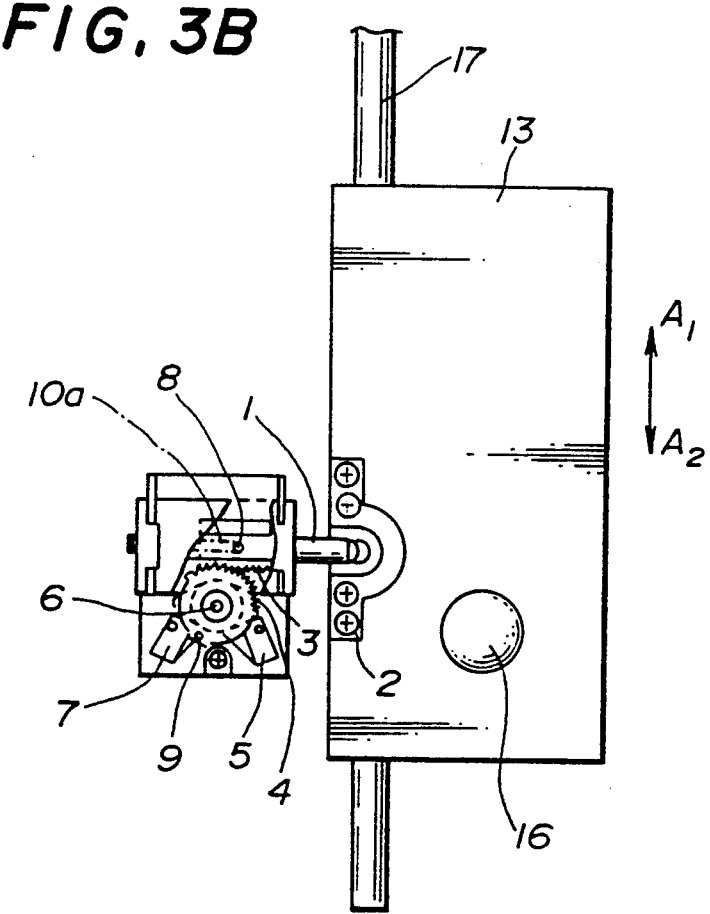

FIGS. 3A and 3B show the head carriage 13 having the fixing part 2. Incidentally, the fixing part may be a groove mounted on the head carriage 13. FIG. 3A shows the relationship among the carriage fixing apparatus, the disk, and the head carriage. The head carriage 13 has a head 15 by which information is recorded on and/or reproduced from the disk 14.

FIG. 3B shows a relationship between the carriage fixing apparatus and the head carriage, and corresponds to the upper view of the FIG. 3A in which the disk 14 is removed. As shown in FIG. 3B, the head carriage 13 is driven by driving means (not shown), and moved in the $A_2A_2$ direction along a guide rod 17. The $A_1A_2$ direction corresponds to the approximately radial direction of the disk 14.

Figure 4:
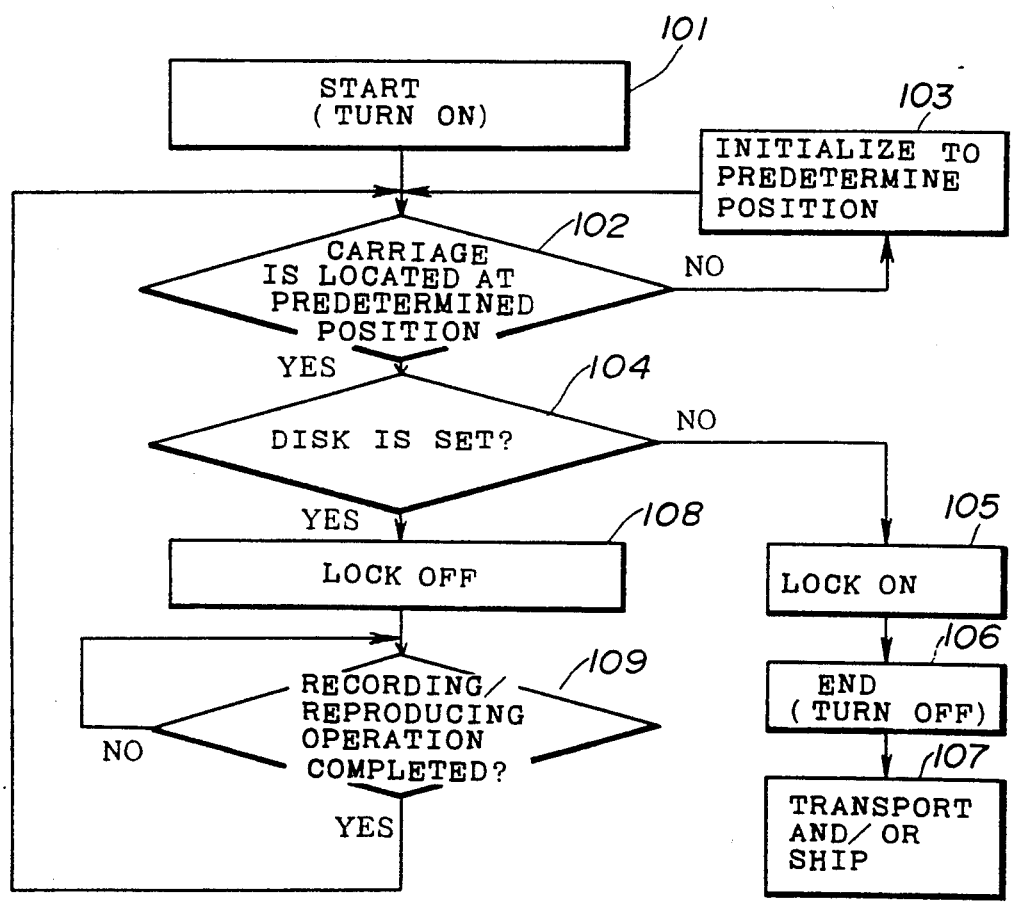
FIG. 4 shows a lock pin control flowchart.

A description will now be given of a lock pin control with reference to FIG. 4. FIG. 4 shows a lock pin control procedure. First, when the power is turned on (in step 101), the carriage position detector detects a position of the head carriage (in step 102). If the head carriage is not located at the predetermined position, such as at the innermost track on the disk, it is moved to the predetermined position (in step 103). On the other hand, if the head carriage is located at the predetermined position, the disk presence detector detects the presence of the disk (in step 104). If the disk is not present, the lock pin is projected (in step 105), and the power is turned off (in step 106) to prepare for the transportation (in step 107). That is, the lock pin is controlled by the AND circuit of the carriage position detection and the disk presence detection. Therefore, when the disk is loaded, the lock pin is withdrawn (in step 108). Consequently, the information is recorded on and/or reproduced from the disk (in step 109), and if the disk is ejected, the head carriage is moved to the innermost track (in the step 102).

A description will now be given of the carriage position detector and the disk presence detector.

Figure 5:
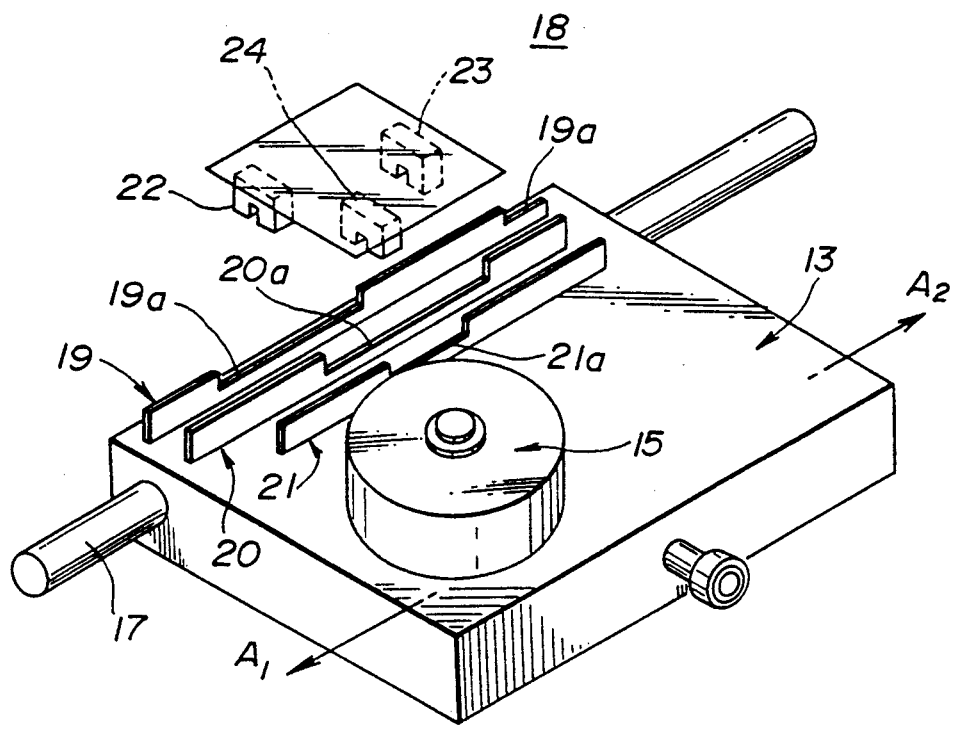
FIG. 5 shows an essential construction of a carriage position detector.
Figures 6A, 6B:
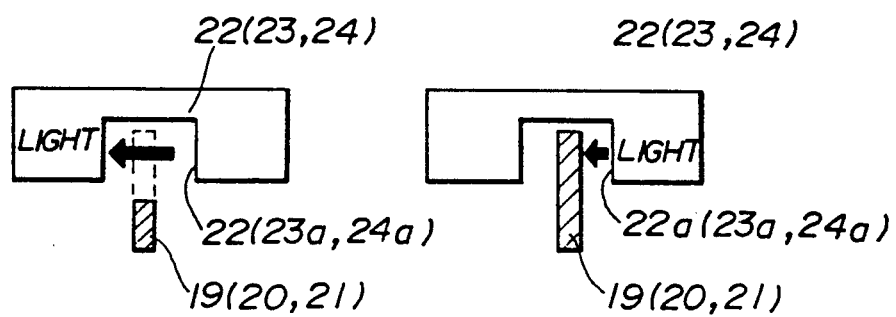
FIG. 6A and 6B show a magnified view of a photosensor.

FIG. 5 shows an essential construction of the carriage position detector 18. The carriage position detector 18 may be attached to the optical disk driver so as to detect the position of the head carriage. The carriage position detector 18 comprises, as shown in FIG. 5, the head carriage 13, the head 15, the guide rod 17, the control shutters 19 to 21, and the photo sensors 22 to 24. The head carriage 13 is driven by the driving means (not shown) so as to move in the $A_1A_2$ direction along the guide rod 17. The head 15 and three control shutters 19 to 21 are attached to the head carriage 13. The control shutters 19 to 21 respectively have specific position detecting grooves 19a to 21a. Therefore, the control shutters 19 to 21 move in the $A_1A_2$ direction with the head carriage 13. The photosensors 22 to 24 comprising a light emitting device and a light detecting device respectively have U-shaped grooves 22a to 24a, as shown in FIGS. 6A and 6B. Each of the photosensors 22 to 24 generates binary position detecting signals 0 and 1. The "1" signal is generated, as shown in FIG. 6A, when the light from the light emitting device reaches the light receiving device. The "0" signal is generated, as shown in FIG. 6B, when the control shutters 19 to 21 are respectively inserted into the U-shaped grooves 22a to 24a to shield the light emitted from the light emitting devices. Each of the photosensors 22 to 24 is fixed in the disk driver with their respective U-shaped grooves 22a to 24a respectively inserted by the control shutters 19 to 21. Because of the three photosensors 22 to 24, an hysteresis error can be modified.

When the head carriage 13 is moved in the $A_1A_2$ direction, the photosensors 22 to 24 move relative to each other on the respective control shutters 19 to 21. Thus, the photosensors 22 to 24 respectively generate a position detecting signal by means of the respective control shutters 49 to 21. The position of the head carriage 13 can be detected by means of the position detecting signal generated by the photosensors 22 to 24.

Figure 7:
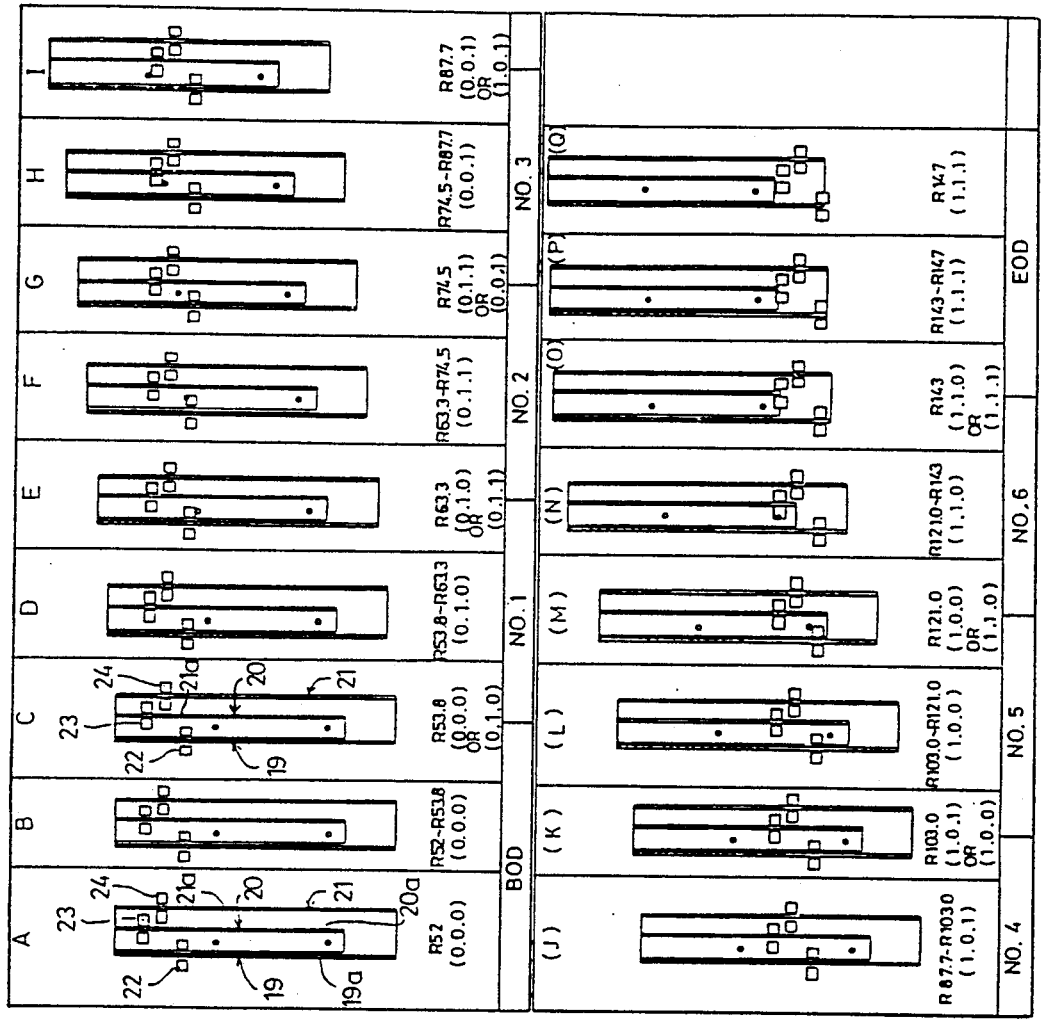
FIG. 7 shows a relationship between a control shutter and the photosensor while a head moves from an innermost track to an outermost track of a disk.

A description will now be given of the position detecting method of the head carriage 13 with reference to FIG. 7. Since there are three control shutters 19 to 21 and three photosensors 22 to 24 and the photosensors generate a binary signal representing "0"and "1", 8 patterns ($2^3$ patterns) can be generated. Now, the term from the innermost track (referred to as BOD track hereinafter) to the outermost track (referred to as EOD track hereinafter) on the disk 14 is segmented into 8 parts, named BOD, No. 1 carriage position detector 18 according to the present invention precisely detects the position of the head carriage 13 by means of segmenting the term into the pattern number generated by the position detecting signal.

FIGS. 7A to 7Q respectively show each respective position of the control shutters 19 to 21 relative to each respective position of the photosensors 22 to 24 while the head carriage 13 is moving from the BOD track to the EOD track. The control shutters 19 to 21 shielding the photosensors are indicated by hatching in FIGS. 7A to 7Q. Numerals R52 etc. (unit: mm) denote the distance between the center of the lens of the head 15 and the rotating center of the disk. Moreover, (0,0,0) etc. denote the position detecting signal, and photosensors 22, 23, and 24 respectively correspond to each of the components of this signal starting from the component on the left thereof.

For example, FIG. 7A shows the head carriage 13 at the BOD position. In this case, the head carriage 13 is spaced from the rotating center of the disk by 52mm, and each photosensor generates the "0" signal. On the other hand, FIG. 7C shows the head carriage 13 at a position including a border between the BOD position and No. 1 position. In this border, the position detecting signals (0,0,0) and (0,0,1) are generated. If the head carriage 13 crosses this border, as shown in FIG. 7D, the position detecting signal becomes (0,0,1). Since the position detecting signal sequentially changes while the head carriage 13 is being moved from the BOD position to the EOD position, the present position of the head carriage 13 can be detected by the position detecting signal.

Hereupon, when the head carriage 13 at one of the borders shown in FIGS. 7C, 7E, 7G, 7I, 7K, 7M, and 7O is being considered, the position detecting signal generated from the photosensors 22 to 24 changes as the head carriage 13 moves. In this embodiment, the position detecting signal of only one photosensor changes for every border. For example, as shown in FIG. 7C, only the photosensor 23 is switched by being inserted into the position detecting groove 20a when the head carriage 13 is moved from the BOD position to the No. 1 position. On the other hand, the other two photosensors 22 and 24 are not switched because they are shielded by the control shutters 19 and 21. At the other border, only one photosensor is switched out of the three photosensors. Incidentally, it is difficult to constitute the carriage position detector 18 so that the two photosensors can be simultaneously switched at the border, and such a carriage position detector is low in precision and malfunctions. Accordingly, in this embodiment, only one photosensor is switched at the border to prevent the malfunction of the disk driver. The conventional variable resistor may be substituted for the carriage position detector according to the present invention.

Figure 8:
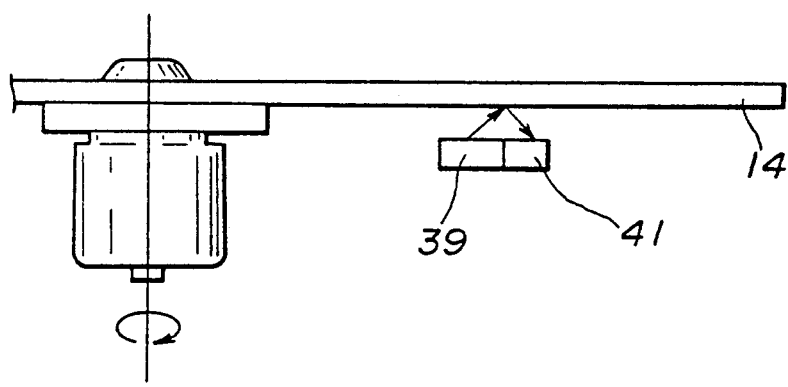
FIG. 8 shows an essential construction of the disk presence detector.

A description will now be given of the disk presence detector. As shown in FIG. 8, it may comprise the light source 39 and the photosensor 41. In this case, the light sensor 41 recognizes the presence of the disk by detecting a light from the light source 39 which is reflected by the loaded disk 11. However, another detector which can detect the presence of the disk may be substituted for the disk presence detector.

Next, FIG. 9 shows a block diagram of the disk driver 25 having a lock pin controlling mechanism according to the present invention. The disk driver 25 comprises a radial motor 26, a system controller 27, a carriage position detector 28, a servo gain switch 29, a motor driver 30, a head driver 31, a radial motor driver 32, and a disk presence detector 33. The disk driver 25 executes focus and/or tracking gain controls, an access control of a radial motor 26, an initializing head detection (BOD position detection), and the like by using the detecting signals outputted from the carriage position detector 28 and the disk presence detector 33.

A description will now be given of the rotation control of the motor shaft 6 of the motor 11. The gear 4 is engaged with the rack 3 and the lock pin 1 projects/withdraws because of the rotating of the motor shaft 6. The motor shaft 6 is controlled by the rotating position of the gear 4 detected by the pin.

Figure 10A:
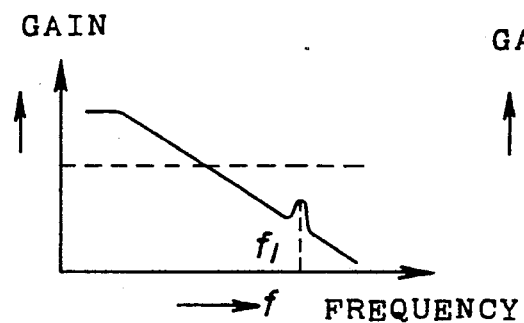
FIGS. 10A and 10B show a relationship between a disturbance input frequency and a zero-crossing of a servo mechanism during high and low speed rotations.
Figure 10B:
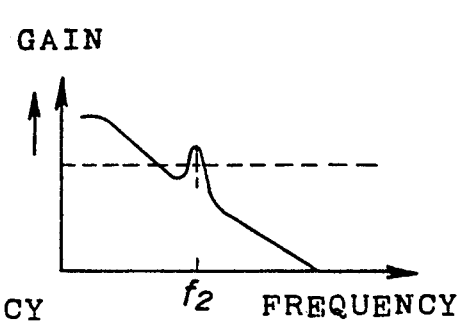

A description will now be given of the focus and/or tracking gain controls of the head 15. These controls operate while the lock pin 1 is withdrawn, and change the gain of the servomechanism by using the pattern of the position detecting signal of the head carriage 13 outputted from the carriage position detector 28. Concretely speaking, the servo gain switch 29 is operated and the gain of the servo mechanism of the head 15 is adjusted by the pattern of the position detecting signal supplied via the system controller 27, so that the focus and/or tracking gain controls are performed without being affected by the disturbance. If the servo gain is fixed, as shown in FIG. 10A, the disturbance frequency $f_1$ during a high rotating speed is lower than the zero-crossing of the servomechanism (indicated by the broken line) and is stable. However, the servo gain it oscillates during a low rotating speed because of the disturbance frequency $f_2$ shown in FIG. 10B. Thus, the reproducing characteristic of the disk driver is improved.

Next, a description will be given of the access control of a radial motor 26 and the initializing head detection. Although it is technically difficult to read out the track information on the disk during accessing, the accessing time can be shortened by using the pattern of the position detecting signal as rough information during the accessing. The reason why the term "rough information" is used because there is a predetermined range in which the carriage position detector can detect the head carriage, as shown in FIG. 7.

Incidentally, the head carriage 13 is required to precisely stop at the read-in track during initializing. If it stops at the non-read-in track, the disk driver malfunctions. Accordingly, the highly precise initializing can be performed by using the position detecting signal.

As mentioned above, according to the present invention, the head carriage can be fully protected from collisions during transporting and/or shipping. In addition, the head carriage is automatically fixed and released from being fixed, which is convenient. Moreover, since the fixing of the head carriage is synchronized with the position detection of the head carriage, the head carriage is definitely fixed and released from being fixed. Furthermore, since the size of the lock pin used for the present invention is not proportional to that of the head carriage, the size of the head carriage can maintain constant. Therefore, the present invention can be useful for a compact disk having a diameter of 12cm and a laser disk having a diameter of 30cm. Besides, since the solenoid etc. which are relatively expensive are not used for the present invention, the carriage fixing apparatus and the disk driving having such a carriage fixing apparatus are relatively inexpensive. In addition the present invention consumes a small amount of power.

Further, the present invention is not limited to these preferred embodiments, but various variations and modifications may be made without departing from the scope of the present invention.

What is claimed is:

1. A carriage fixing apparatus in a disk driver comprising a head by means of which at least one of recording information on a disk and reproducing information from a disk is carried out, the carriage fixing apparatus comprising:

first detecting means for detecting a position of a head carriage that moves the head;

fixing means, responsive to said first detecting means, for automatically fixing the head carriage by mechanically engaging with the head carriage when the first detecting means detects that the head carriage is located at a predetermined position; and wherein said disk is exchangeably provided to the disk driver, and said carriage fixing apparatus further comprises second detecting means for detecting the presence of the disk, said fixing means fixing the head carriage when said second detecting means detects that the disk is not inserted into the disk driver.

2. A carriage fixing apparatus according to claim 1, wherein said fixing means comprises an engaging member which is fixed in the disk driver and is engaged with the head carriage.

3. A carriage fixing apparatus according to claim 1, wherein said predetermined position is the innermost track on the disk.

4. A carriage fixing apparatus according to claim 2, wherein the head carriage moves in an approximately radial direction of the disk, and the engaging member is projected and withdrawn in a direction approximately normal to a moving direction of the head carriage to be engaged with the head carriage.

5. A carriage fixing apparatus according to claim 1, wherein said fixing means comprises:

a gear;

rotating means for rotating said gear;

a first groove formed in the head carriage;

a lock pin that can be engaged with said first groove; and a rack, provided around the lock pin, which carries out at least one of projecting and withdrawing the lock pin by engaging with the gear, the head carriage being fixed when the lock pin is projected and engaged with the first groove.

6. A carriage fixing apparatus according to claim 5, wherein a first pin is mounted on the lock pin, and the rack has a second groove with which the first pin is engaged, the first pin being moved with the lock pin along the second groove.

7. A carriage fixing apparatus according to claim 5, wherein said fixing means further comprises a resin bearing metal, the lock pin being moved via the bearing metal.

8. A carriage fixing apparatus according to claim 5, wherein the front end of the lock pin is formed in an approximately domed shape, the front end thereof being engaged with the first groove which is gouged out to correspond the domed shape lock pin.

9. A carriage fixing apparatus according to claim 1, wherein said first detecting means comprises:

a photosensor fixed in the disk driver;

a control shutter fixed in the head carriage, the control shutter having a position detecting groove, and the photosensor detecting, by means of detecting the position detecting groove, whether or not the head carriage is located at the predetermined position.

10. A carriage fixing apparatus according to claim 9, wherein said first detecting means further comprises n, which is an arbitrary integer, photosensors and n control shutters, each control shutter respectively having a position detecting groove at a position different from another control shutter, each photosensor generating a binary signal representing whether or not a photo sensor detects a corresponding position detecting groove of the control shutter, said first detecting means indicating of what part the head carriage is located by means of patterns of a position detecting signal $2^2$ which are generated by the number "n" and the binary signal, and each conceivable position of the head carriage being segmented into $2^n$ parts.

11. A carriage fixing apparatus according to claim 10, wherein the position detecting signal is generated by changing the binary signal of only one photosensor at a border of the $2^2$ parts.

12. A carriage fixing apparatus according to claim 1, wherein the second detecting means comprises:

a light source; and a photosensor which detects the presence of the disk by means of detecting a light from the light source.

13. A disk driver comprising:

a head by means of which at least one of recording information on a disk and reproducing information from a disk is carried out;

a head carriage that moves said head;

a carriage fixing apparatus comprising first detecting means for detecting a position of said head carriage and said fixing means, responsive to said first detecting means, for automatically fixing the head carriage by mechanically engaging with the head carriage when the first detecting means detects that the head carriage is located at a predetermined position;

wherein said disk driver further comprises focus control means for executing a focus controlling of said head based on the detecting result of the first detecting means; and wherein the focus control means changes a servo gain of a servomechanism of said disk driver based on the detecting result of the first detecting means.

14. A disk driver, comprising:

a head by means of which at least one of recording information on a disk and reproducing information from a disk is carried out;

a head carriage that moves said head;

a carriage fixing apparatus comprising first detecting means for detecting a position of said head carriage and fixing means, responsive to said first detecting means, for automatically fixing the head carriage by mechanically engaging with the head carriage when the first detecting means detects that the head carriage is located at a predetermined position;

wherein said disk driver further comprises tracking control means for executing a tracking controlling of said head based on the detecting result of the first detecting means; and wherein the tracking control means changes a servo gain of a servomechanism of said disk driver based on the detecting result of the first detecting means.

15. A disk driver according to claim 13, wherein said disk driver further comprises access control means for accessing a predetermined track on the disk based on the detecting result of the first detecting means.

16. A disk driver comprising:

a head by means of which at least one of recording information on a disk and reproducing information from a disk is carried out;

a head carriage that moves said head;

a carriage fixing apparatus comprising first detecting means for detecting a position of said head carriage and fixing means, responsive to said first detecting means, for automatically fixing the head carriage by mechanically engaging with the head carriage when the first detecting means detects that the head carriage is located at a predetermined position; and wherein said disk driver further comprises initializing detecting means for detecting an initial track of at least one of a recorded area and a non-recorded area of the disk based on the detecting result of the first detecting means.

17. A disk driver according to claim 14 wherein said disk driver further comprises access control means for accessing a predetermined track on the disk based on the detecting results of the first detecting means.

* * * * *

UNITED STATES PATENT AND TRADEMARK OFFICE
CERTIFICATE OF CORRECTION

PATENT NO. : 5,231,615
DATED : July 27, 1993
INVENTOR(S) : Atsushi Endoh

It is certified that error appears in the above-identified patent and that said Letters Patent is hereby corrected as shown below:

CLAIM 10, Col. 8, Line 28, delete "of" and substitute therefor ---at---; CLAIM 10, Col. 8, Line 29, delete "$2^2$" and substitute therefor ---$2^n$---; CLAIM 11, Col. 8, Line 36, delete "$2^2$" and substitute therefor ---$2^n$---

Signed and Sealed this

Twenty-ninth Day of March, 1994

Attest:

BRUCE LEHMAN

*Attesting Officer*     *Commissioner of Patents and Trademarks*